(12) United States Patent
Li et al.

(10) Patent No.: US 9,214,745 B1
(45) Date of Patent: Dec. 15, 2015

(54) FIXTURE FOR ELECTRONIC DEVICE

(71) Applicants: Inventec (Pudong) Technology Corporation, Shanghai (CN); INVENTEC CORPORATION, Taipei (TW)

(72) Inventors: Ming-gang Li, Shanghai (CN); Xiu-hua Zhao, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/528,803

(22) Filed: Oct. 30, 2014

(30) Foreign Application Priority Data

Sep. 17, 2014 (CN) .......................... 2014 1 0475487

(51) Int. Cl.
*H01R 13/60* (2006.01)
*H01R 12/70* (2011.01)

(52) U.S. Cl.
CPC .................. *H01R 12/7076* (2013.01)

(58) Field of Classification Search
CPC ... H05K 7/1489; H05K 7/1411; H05K 13/00; H05K 7/14; H05K 1/141; H01R 13/518; H01R 13/74; H01R 13/6658; H01R 12/716; H01R 24/52; H01R 2201/06
See application file for complete search history.

(56) References Cited

U.S. PATENT DOCUMENTS

| | | | | |
|---|---|---|---|---|
| 7,031,152 B1 * | 4/2006 | Tsai | ........................ | G06F 1/184 312/223.2 |
| 7,701,725 B2 * | 4/2010 | Fan | ........................ | G06F 1/187 361/752 |
| 9,030,819 B2 * | 5/2015 | He | .......................... | H05K 7/14 248/222.51 |
| 2010/0259884 A1 * | 10/2010 | Wang | ..................... | G06F 1/185 361/679.33 |
| 2013/0215568 A1 * | 8/2013 | Kumachi | ................ | G06F 1/187 361/679.33 |

* cited by examiner

*Primary Examiner* — Xuong Chung Trans
(74) *Attorney, Agent, or Firm* — Muncy, Geissler, Olds & Lowe, P.C.

(57) ABSTRACT

A fixture for electronic device includes a first frame and a second frame. The first frame is fixed to a tray. A backplane is disposed on the first frame. A first electronic device is connected to the backplane and set in the first frame. The backplane is electrically connected the first electronic device and a motherboard by a cable, in which the motherboard is arranged on the tray. The second frame is pivotally connected to the first frame. A transfer board is fixed to the second frame. A second electronic device is connected to the transfer board, and assembled into the second frame. The second frame is fixed onto the tray, and the transfer board is connected to a connection port of the motherboard when the second frame is located in a first position, so as to make the second electronic device electrically connect to the motherboard.

8 Claims, 9 Drawing Sheets

FIXTURE FOR ELECTRONIC DEVICE

FIELD OF THE INVENTION

This invention is related to a fixture for electronic device, and more particularly related to a fixture for fixing a first electronic device and a second electronic device on a motherboard.

BACKGROUND OF THE INVENTION

In recent years, attending with the rapid development in smart handheld devices, people spent more and more time on internet and also generated more and more electronic data each day. Meanwhile, people gradually changed the habit of storing electronic data in the terminal device to storing electronic data to the remote server such that the amount of electronic data would not be restricted by the storing module in the terminal device and the data can be effectively reserved.

As mentioned, because people are gradually used to store data in cloud, hardware providers are looking for servers with higher performance. However, a server is usually integrated with a large number of storing apparatuses in order to provide a huge storing space. In addition, the server needs a safe and steady space to make sure to an effective operation. Because of above mentioned limitations, in consideration of space allocation for a server, it is demanded to use the smallest space for generating the most efficient storing space.

However, because the storing apparatuses of the server in present are closely arrayed, if there has the demand to maintain, change or expand the electronic device, the entire server needs to be tiered down for doing such operation, which is quite inconvenient for the user and efficiency is low.

BRIEF SUMMARY OF INVENTION

In view of the prior art, as the user wants to maintain, change, or expand the electronic device, the entire server needs to be tiered down for doing the above mentioned operations. However, because these electronic devices are quite precise, it is not adequate to move the electronic device frequently.

Accordingly, it is a main object of the present invention to provide a fixture for electronic device which can be used to fix a plurality of electronic devices and remove or assemble individual electronic device according to the need.

As mentioned, a fixture for electronic device is provided in the present invention. The fixture is utilized to fix at least a first electronic device, at least a second electronic device, a backplane, and a transfer board on a motherboard, wherein the motherboard is disposed on a tray, and the motherboard includes at least a central processing unit and a connection port. The fixture comprises a first frame and a second frame.

The first frame is fixed to a tray, the backplane is disposed on the first frame, and the first electronic device is connected to the backplane and set in the first frame such that the first electronic device is electrically connected the motherboard through the backplane by a cable. The second frame is pivotally connected to the first frame, the transfer board is fixed to the second frame, and the second electronic device is connected to the transfer board and assembled into the second frame. The second frame is fixed onto the tray and the transfer board is connected to the connection port of the motherboard when the second frame is located in a first position, so as to make the second electronic device electrically connect to the motherboard through the transfer board.

Wherein, when the second frame rotates from the first position to a second position, the transfer board is pulled out from the connection port for user to change the second electronic device.

In accordance with an embodiment of the present invention, the fixture for electronic device further comprises a shaft, which penetrates the first frame and the second frame, such that the second frame is capable to be rotated between the first position and the second position centered at the shaft.

As a preferred embodiment, the second frame centered at the shaft is rotated 180 degrees from the first position to the second position. In addition, the first frame includes a first pivotally connecting portion, the second frame includes a second pivotally connecting portion, and the shaft penetrates through and is located in the first pivotally connecting portion and the second pivotally connecting portion. Moreover, as a preferred embodiment, there are plural of first pivotally connecting portions and plural of second pivotally connecting portions alternatively arranged.

In accordance with an embodiment of the present invention, the first frame includes a base and a support, the support is fixed to the base, and the second frame is pivotally connected to the base.

In accordance with an embodiment of the present invention, the first frame includes a first positioning portion, and the second frame includes a second positioning portion corresponding to the first positioning portion.

In accordance with an embodiment of the present invention, the first electronic device is a data storing unit, and the second electronic device is an interface card unit.

The embodiments in the present invention would be further discussed by using the flowing paragraphs and figures for a better understanding.

DETAILED DESCRIPTION OF THE INVENTION

Figure 1:
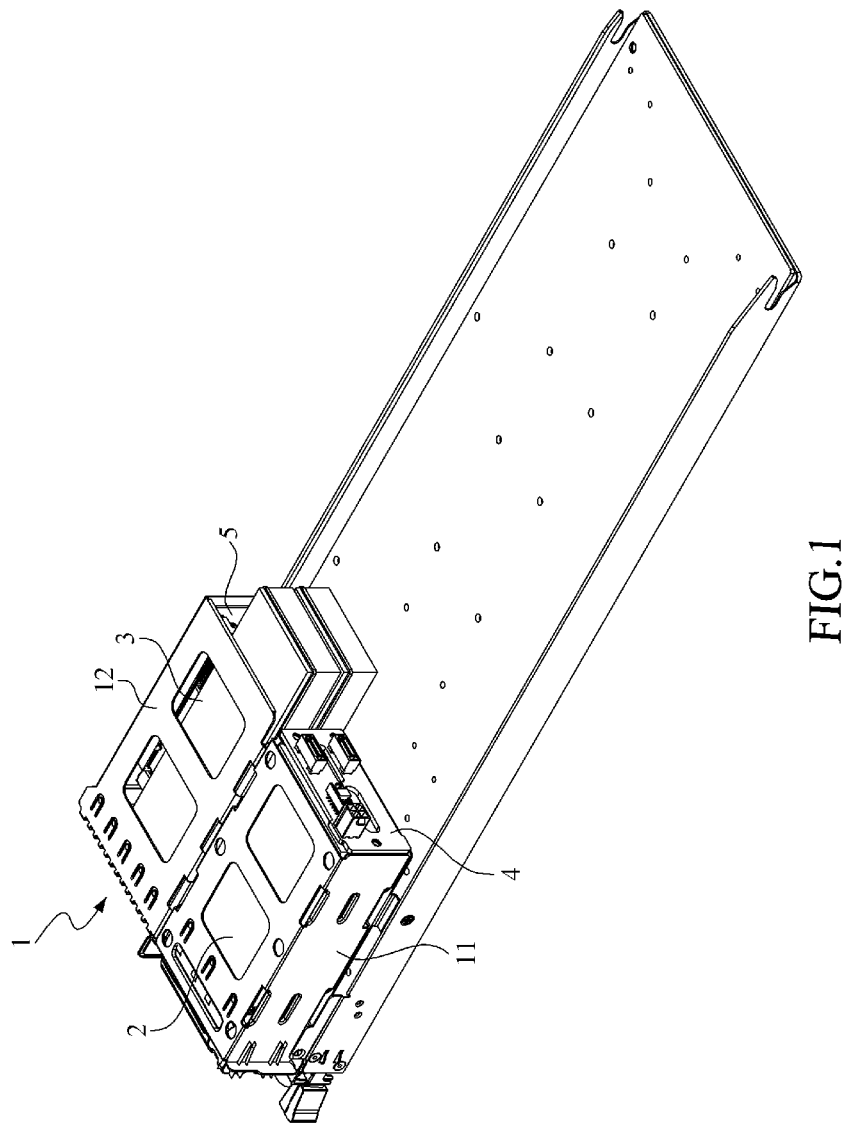
FIG. 1 is a 3D schematic view showing the fixture for electronic device provided in accordance with a preferred embodiment of the present invention being fixed to a tray.
Figure 2:
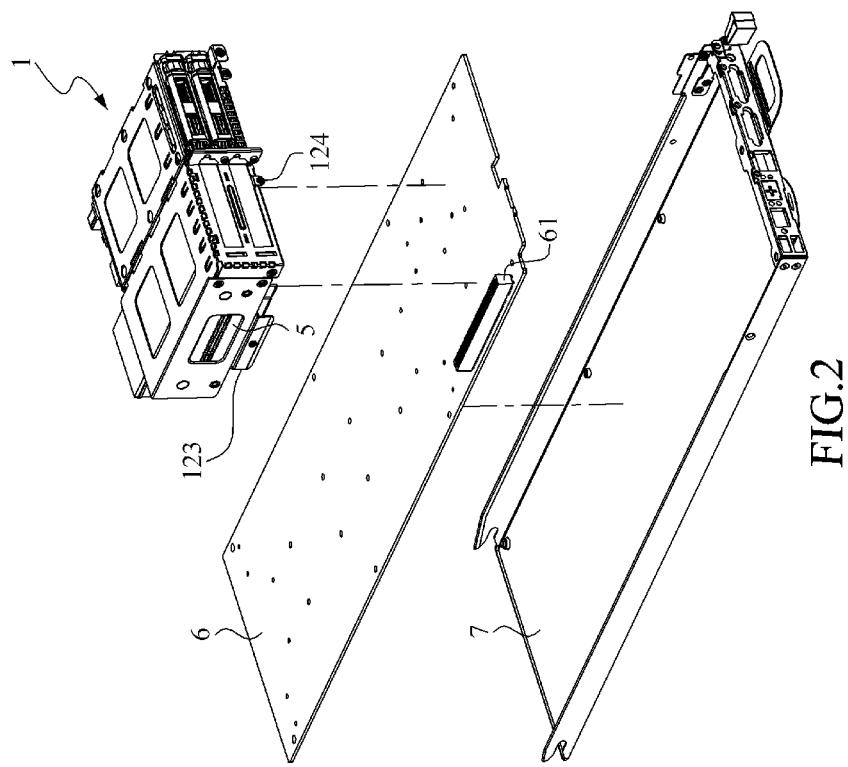
FIG. 2 is a 3D explosive view showing the fixture for electronic device in accordance with a preferred embodiment of the present invention, a motherboard, and the tray.

Please refer to FIG. 1 and FIG. 2, wherein FIG. 1 is a 3D schematic view showing the fixture for electronic device provided in accordance with a preferred embodiment of the present invention being fixed to a tray, and FIG. 2 is a 3D explosive view showing the fixture for electronic device in accordance with a preferred embodiment of the present invention, a motherboard, and the tray. As shown, the fixture 1 for electronic device, which is utilized to fix two first electronic devices 2, two second electronic devices 3, a backplane 4, and a transfer board 5 on a motherboard 6, wherein the motherboard 6 is disposed on a tray 7, and the motherboard 6 includes at least a central processing unit (not shown) and a connection port 61.

Figure 3:
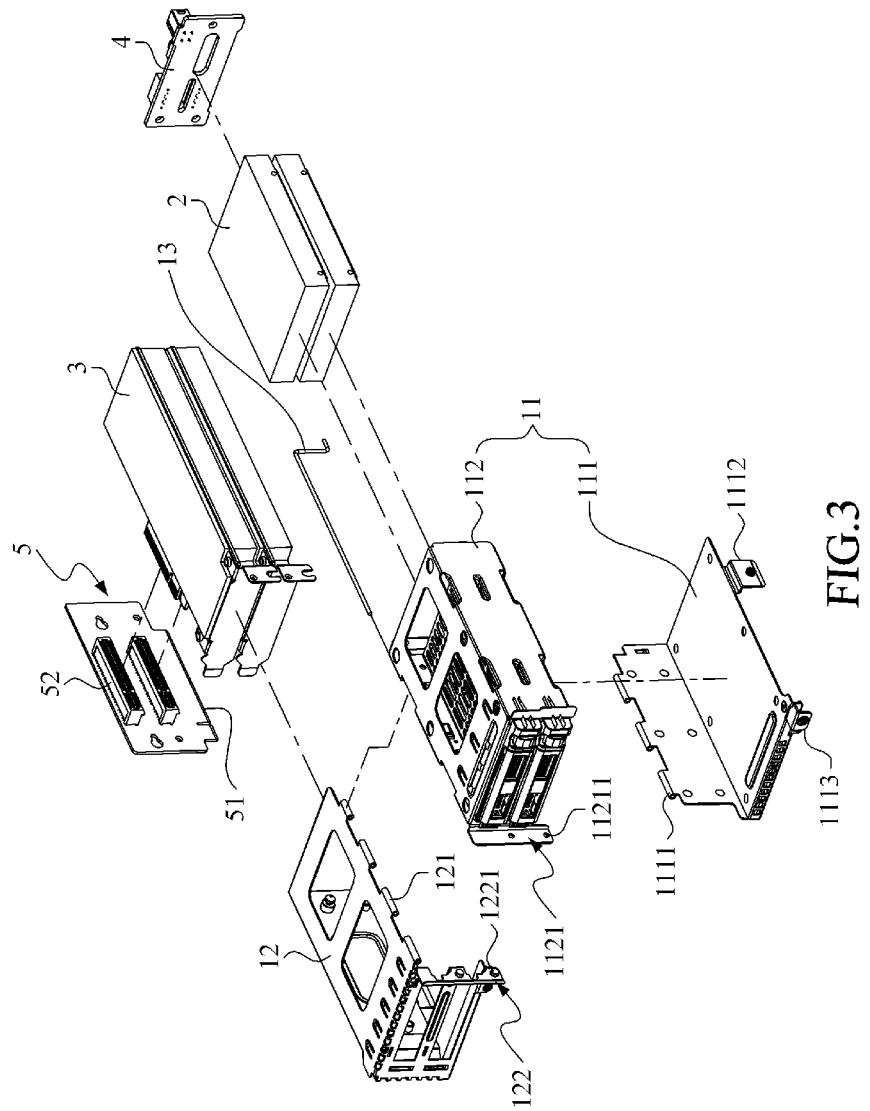
FIG. 3 is a 3D explosive view showing the fixture for electronic device in accordance with a preferred embodiment of the present invention.

Please further refer to FIG. 3, which is a 3D explosive view showing the fixture for electronic device in accordance with a preferred embodiment of the present invention. As shown, the fixture 1 for electronic device includes a first frame 11, a second frame 12, and a shaft 13.

The first frame 11 includes a base 111 and a support 112. The base 111 includes three first pivotally connecting portions 1111 and two fixing portions 1112 and 1113. The first pivotally connecting portions 1111 are utilized for locating the shaft 13 in a manner that the shaft 13 penetrating there through. The fixing portions 1112 and 1113 are fixed to the tray 7 by screws. The support 112 is fixed to the base 111. The support 112 includes a first positioning portion 1121, and the first positioning portion 1121 includes two first positioning holes 11211.

The second frame 12 includes four pivotally connecting portions 121, a second positioning portion 122, and two fixing portions 123 and 124. The second pivotally connecting portions 121 and the first pivotally connecting portions 1111 are alternatively arranged. In addition, the second pivotally connecting portions 121 are utilized for locating the shaft 13 in a manner that the shaft 13 penetrating there through such that the second frame 12 is pivotally connected to the support 112. Because the shaft 13 penetrates the first pivotally connecting portions 1111 and the second pivotally connecting portions 121 alternatively, the second frame 12 is pivotally connected to the first frame 11.

The second positioning portion 122 is corresponding to the first positioning position 1121, and the second positioning portion 122 has two second positioning holes 1221 corresponding to the first positioning holes 11211 such that as the first positioning portion 1121 is attached to the second positioning portion 122, the first positioning holes 11211 and the second positioning holes 1221 can be used for screw-fixing the first frame 11 and the second frame 12.

The fixing portions 123 and 124 are utilized for fixing to the tray 7 by screws.

The first electronic device 2 is set in the first frame 11 and the second electronic device 3 is set in the second frame 12.

The backplane 4 is disposed on and fixed to the first frame 11. The first electronic device 2 is electrically connected to the backplane 4 and set in the first frame 11 such that the first electronic device 2 is electrically connected the motherboard 6 through the backplane 4 by a cable (not shown).

The transfer board 5 is fixed to the second frame 12, and the second electronic device 3 is electrically connected to the transfer board 5 and assembled into the second frame 12. The second frame 12 is fixed to the tray 7 when the second frame 12 is located in a first position. The transfer board 5 includes a plug 51 and two slots 52. When the second frame 12 is located in the first position, the plug 51 is plugged into the connection port 61 so as to have the second electronic device 3 electrically connected to the motherboard 6 through the transfer board 5. The slots 52 are utilized for plugging the second electronic device 3.

Figure 4:
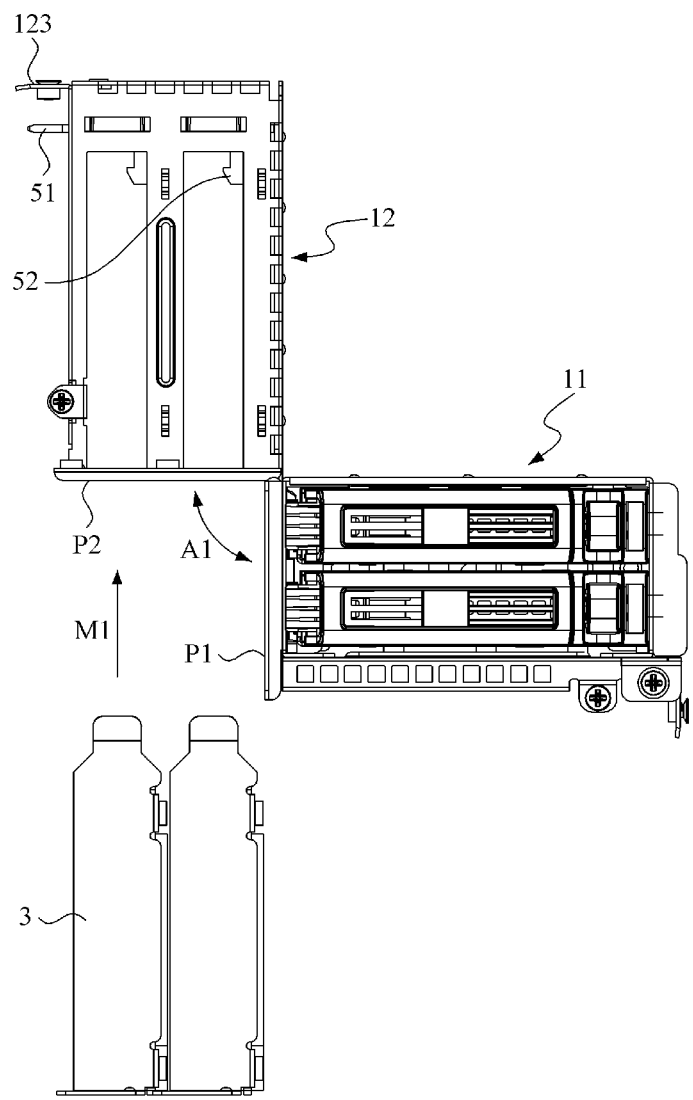
FIG. 4 is a schematic side view showing the relative rotation between the first frame and the second frame of the fixture for electronic device in accordance with a preferred embodiment of the present invention.

FIG. 4 is a schematic side view showing the relative rotation between the first frame and the second frame of the fixture for electronic device in accordance with a preferred embodiment of the present invention. As shown, the surface of the first positioning portion 1121 facing the second positioning portion 122 is defined as a first assembling surface P1, and the surface of the second positioning portion 122 facing the first positioning portion 1121 is defined as a second assembling surface P2. The position with the axis at the shaft 13 and the included angle between the first assembling surface P1 and the second assembling surface P2 equals to 0° is defined as the first position. That is, the second positioning portion 122 of the second frame 12 attaches the first positioning portion 1121 so as to have the top surfaces of the first frame 11 and the second frame 12 located at the same horizontal surface, e.g. the relative position shown in FIG. 2. In practice, when the second frame 12 is rotated centered at the shaft 13 with respective to the first frame 11 to a position with a first included angle A1 between the first assembling surface P1 and the second assembling surface P2, the second electronic device 3 can be plugged into the slot 52 along an assembling direction M1 and set in the second frame 12.

Figure 5:
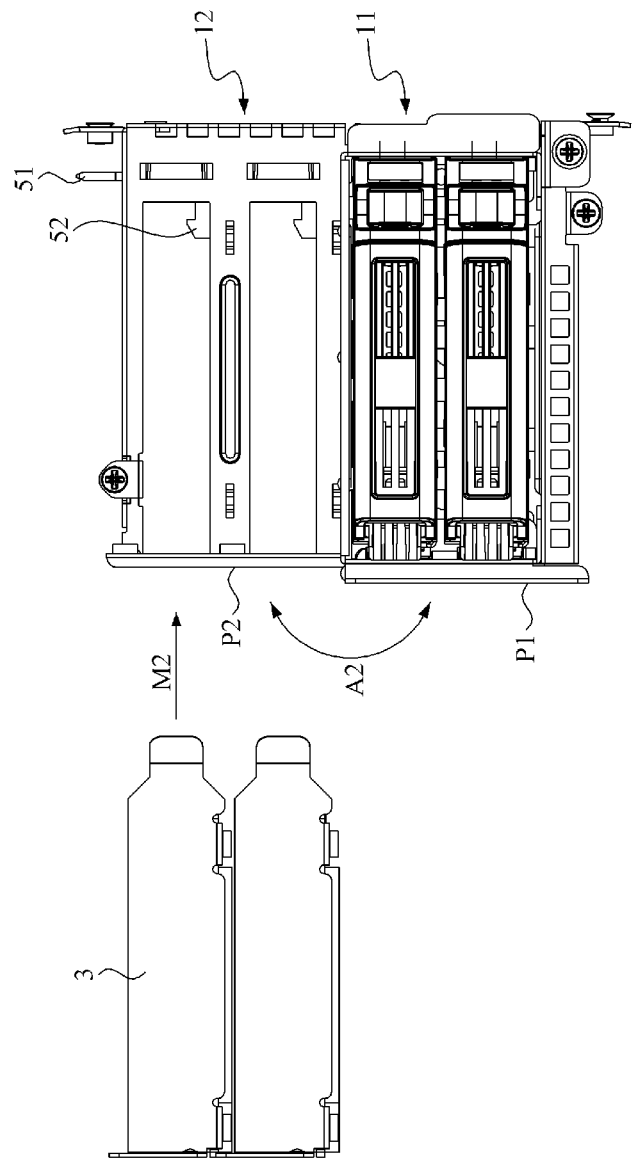
FIG. 5 is a schematic side view showing the second frame of the fixture for electronic device in accordance with a preferred embodiment of the present invention, which is rotated with respective to the first frame to a position of which the top surfaces thereof are attached with each other.

FIG. 5 is a schematic side view showing the second frame of the fixture for electronic device in accordance with a preferred embodiment of the present invention, which is rotated with respective to the first frame to a position that the top surfaces thereof are attached with each other. As shown, when the second frame 12 is rotated with respective to the first frame 11 to a second position, i.e. the position with a second included angle A2 between the first assembling plane P1 and the second assembling plane P2 equals to 180°, the second electronic device 3 can be plugged into the slot 52 along an assembling direction M2 and set in the second frame 12.

As mentioned, before the first frame 11 and the second frame 12 are assembled to the tray 7, the second frame 12 can be rotated 90°-180° centered at the shaft 13 for setting the second electronic device 3 in the second frame 12.

Figure 6:
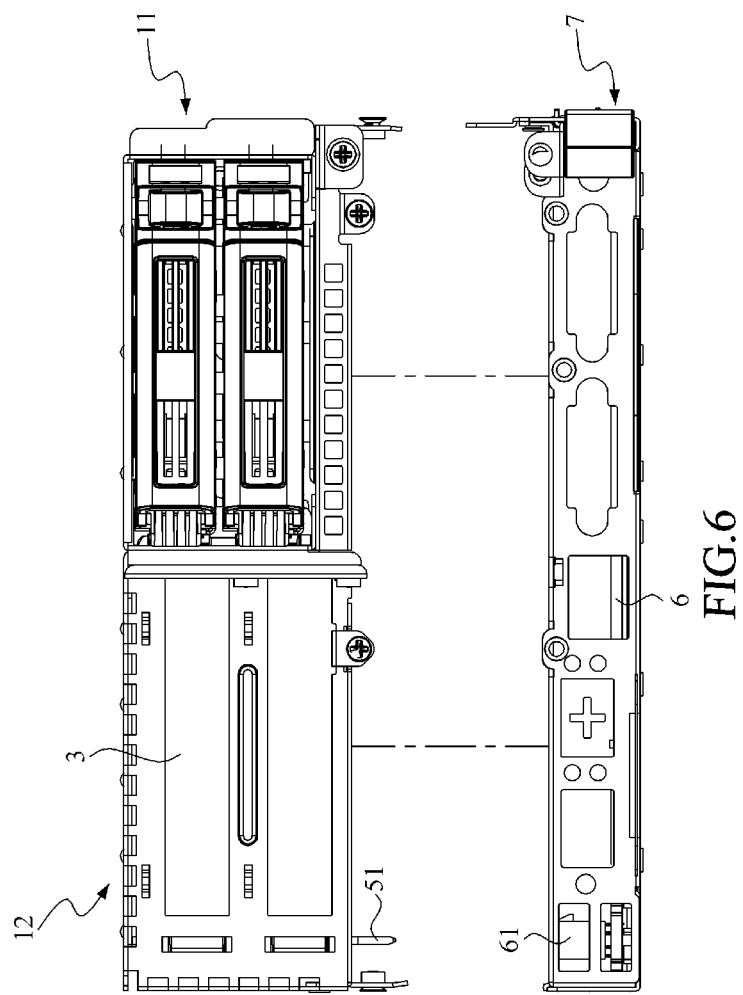
FIG. 6 is a schematic side view showing the fixture for electronic device being separated from the tray in accordance with a preferred embodiment of the present invention.
Figure 7:
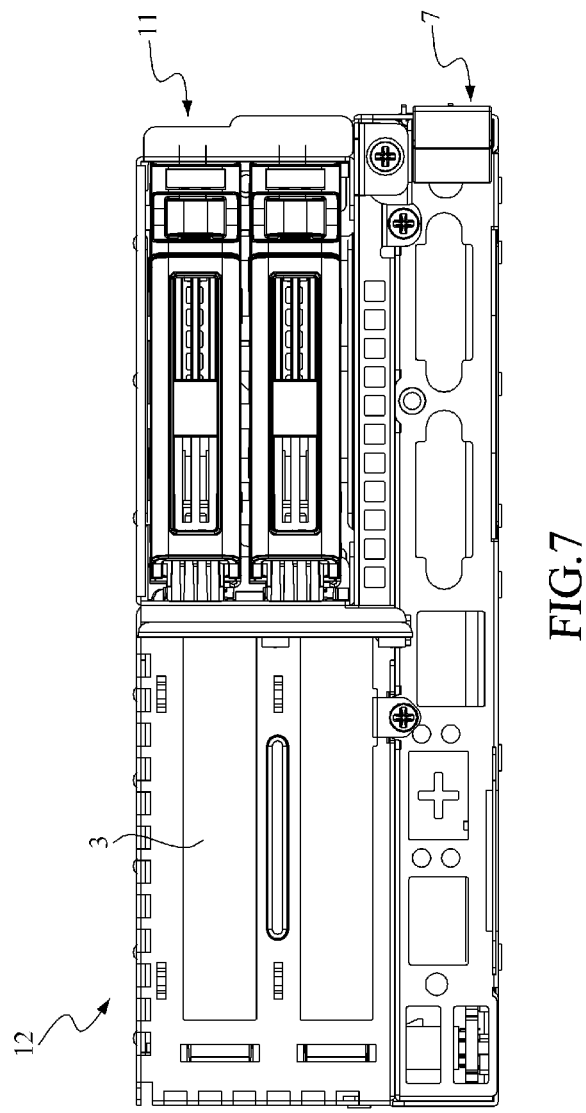
FIG. 7 is a schematic side view showing the fixture for electronic device being fixed to the tray in accordance with a preferred embodiment of the present invention.

Please also refer to FIG. 6 and FIG. 7, wherein FIG. 6 is a schematic side view showing the fixture for electronic device separated from the tray in accordance with a preferred embodiment of the present invention, and FIG. 7 is a schematic side view showing the fixture for electronic device fixed to the tray in accordance with a preferred embodiment of the present invention. As shown, after the second electronic device 3 has been disposed set in the second frame 12, the second frame 12 can be moved back to the first position, and then the whole fixture 1 for electronic device can be fixed to the tray 7, meanwhile, the plug 51 would be plugged into the slot 61.

Figure 8:
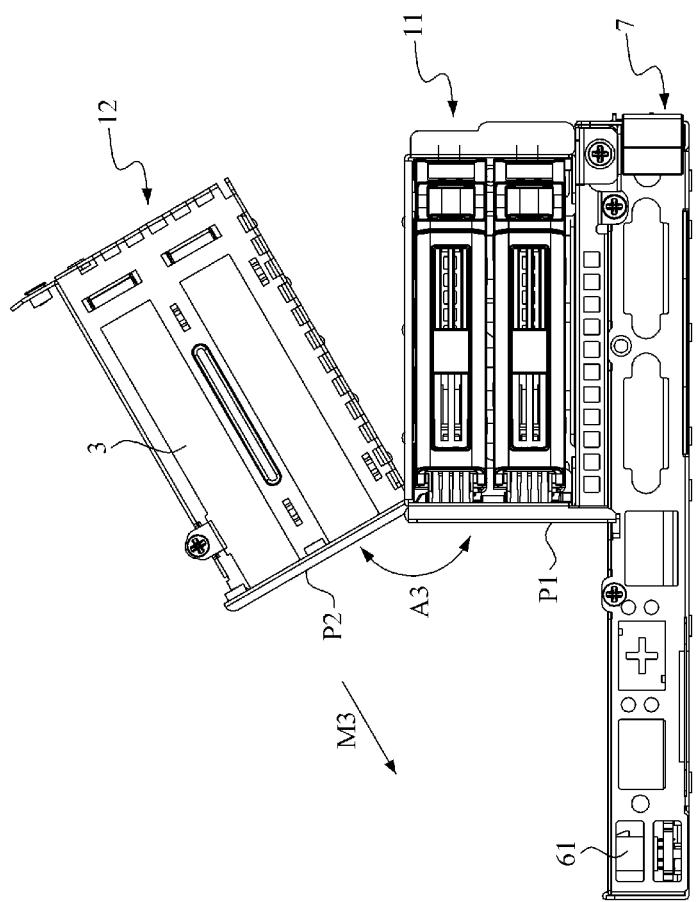
FIG. 8 is a schematic side view showing the fixture for electronic device being fixed to the tray and the second frame rotating to a position between the first position and the second position in accordance with a preferred embodiment of the present invention.
Figure 9:
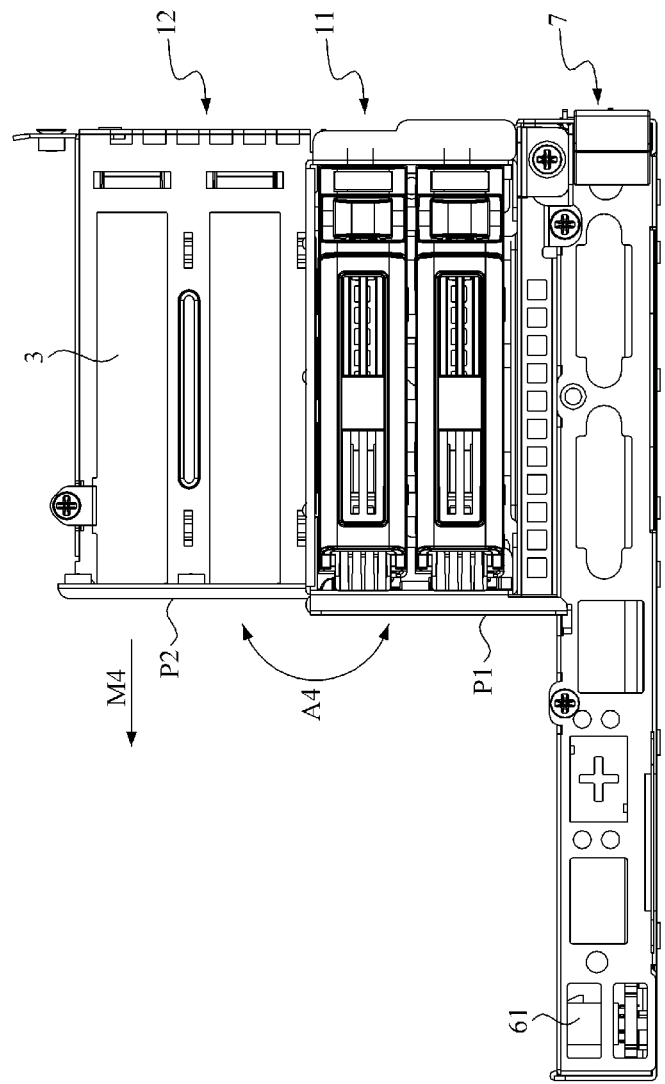
FIG. 9 is a schematic side view showing the fixture for electronic device being fixed to the tray and the second frame rotating to the second position in accordance with a preferred embodiment of the present invention.

Please further refer to FIG. 8 and FIG. 9, wherein FIG. 8 is a schematic side view showing the fixture for electronic device being fixed to the tray and the second frame being rotated to a position between the first position and the second position in accordance with a preferred embodiment of the present invention, and FIG. 9 is a schematic side view showing the fixture for electronic device being fixed to the tray and the second frame being rotated to the second position in accordance with a preferred embodiment of the present invention. As shown, after the fixture 1 for electronic device has been set to the tray 7, if the user needs to repair or change second electronic device 3, the user may just release the fixture between the tray 7 and the second frame 12, rotate the second frame 12 to the position between the first position and the second position to form a third included angle A3 between the first assembling plane P1 and the second assembling plane P2, such that the second electronic device 3 can be removed along a removing direction M3 for repairing or changing the electronic device. As a preferred embodiment, the user may further rotate the second frame 12 to the position forming a fourth included angle A4 between the first assembling plane P1 and the second assembling plane P2, such that the second electronic device 3 can be removed along a removing direction M4 for repairing or exchanging the electronic device.

As the second frame 12 is rotated from the first position to the second position, the transfer board 5 would be pulled out from the slot 61 attending with the rotation of the second frame 12 such that the user can change or repair the second electronic device 3.

In case that the fixture 1 for electronic device is not set on the tray 7, the second frame 12 needs to rotate 90°-180° for assembling the second electronic device 3. In contrast, in case the fixture 1 for electronic device is set on the tray 7, the second frame 12 needs to rotate 150°-180° for changing or repairing the second electronic device 3.

In practice, the first electronic device 2 may be a data storing unit, such as the hard disk drive (HDD), and the second electronic device 3 may be an interface card unit, such as a PCI Express (PCI-E) card.

In conclusion, in view of the conventional art, if there is a specific storing apparatus in the server needs to be maintained, changed or expanded, the other storing apparatuses usually need to be removed first, which is quite inconvenient. In contrast, by using the fixture for electronic device provided in the present invention, if only the first electronic device or the second electronic device needs to the changed or repaired, the user just needs to release the first frame or the second frame and adopt the pivotally connection structure between the first frame and the second frame to have the released frame rotated with respective to the other one so as to facilitate the user to repair or change the electronic device.

In addition, because the first frame and the second frame are pivotally connected though the shaft, only the free side of the first frame and the second frame needs to be fixed, and thus the fixture provided in the present invention does not need to fix various frames as the conventional art such that the assembling time can be reduced to enhance assembling efficiency.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A fixture for electronic device, which is utilized to fix at least a first electronic device, at least a second electronic device, a backplane, and a transfer board on a motherboard, wherein the motherboard is disposed on a tray, and the motherboard includes at least a central processing unit and a connection port, the fixture comprising:

a first frame, fixed to a tray, the backplane being disposed on the first frame, and the first electronic device being connected to the backplane and set in the first frame such that the first electronic device is electrically connected the motherboard through the backplane by a cable; and a second frame, pivotally connected to the first frame, the transfer board being fixed to the second frame, the second electronic device being connected to the transfer board and assembled into the second frame, the second frame being fixed onto the tray and the transfer board being connected to the connection port of the motherboard when the second frame is located in a first position, so as to make the second electronic device electrically connect to the motherboard through the transfer board;

wherein, when the second frame rotates from the first position to a second position, the transfer board is pulled out from the connection port for user to change the second electronic device.

2. The fixture for electronic device of claim 1, further comprising a shaft, penetrating the first frame and the second frame, such that the second frame is capable to be rotated between the first position and the second position centered at the shaft.

3. The fixture for electronic device of claim 2, wherein the second frame is rotated 180 degrees centered at the shaft from the first position to the second position.

4. The fixture for electronic device of claim 2, wherein the first frame includes a first pivotally connecting portion, the second frame includes a second pivotally connecting portion, and the shaft penetrates through and is located in the first pivotally connecting portion and the second pivotally connecting portion.

5. The fixture for electronic device of claim 4, wherein there are plural of first pivotally connecting portions and plural of second pivotally connecting portions alternatively arranged.

6. The fixture for electronic device of claim 1, wherein the first frame includes a base and a support, the support is fixed to the base, and the second frame is pivotally connected to the base.

7. The fixture for electronic device of claim 1, wherein the first frame includes a first positioning portion, the second frame includes a second positioning portion, and the second positioning portion is corresponding to the first positioning portion.

8. The fixture for electronic device of claim 1, wherein the first electronic device is a data storing unit, and the second electronic device is an interface card unit.

* * * * *